May 11, 1926. 1,584,428
J. L. BREDAR
ANTICHATTER FOR BALL JOINTS
Filed March 31, 1924
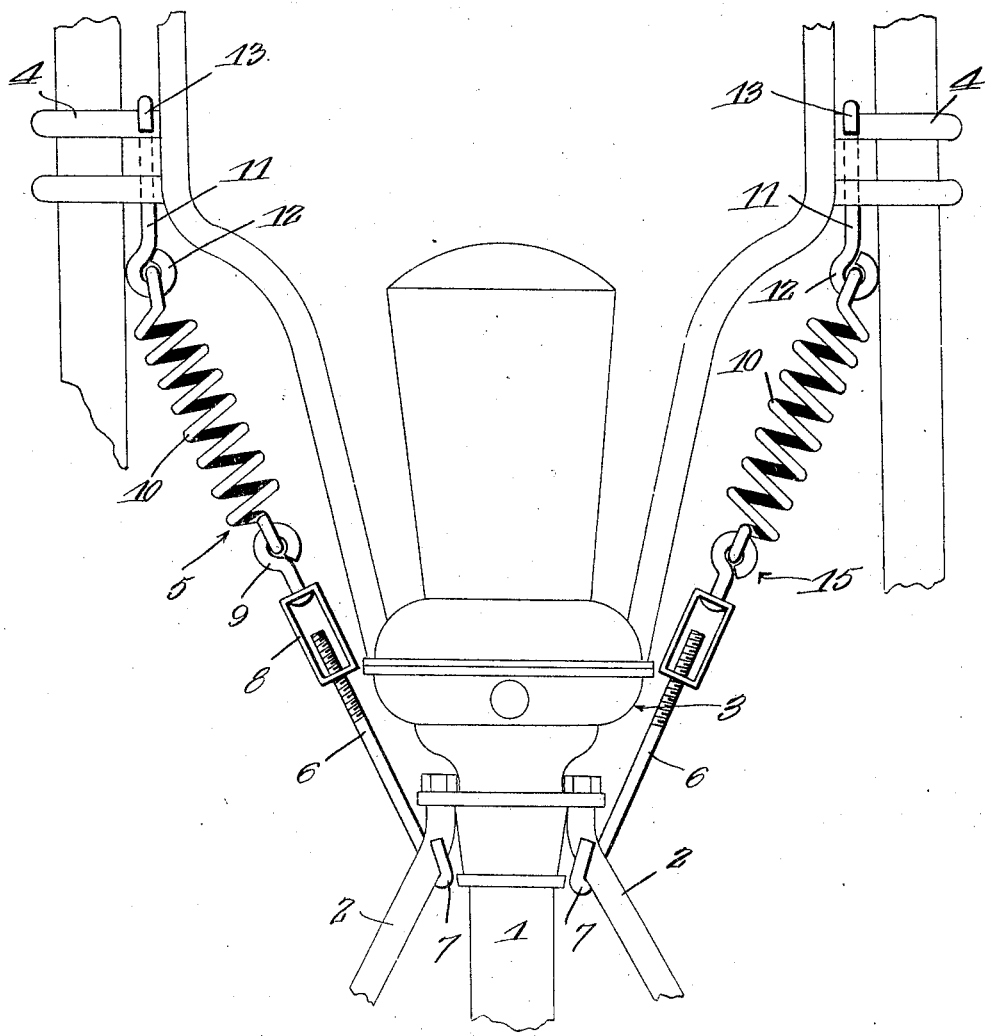
J. L. Bredar, Inventor
By C. A. Snow & Co.
Attorneys Patented May 11, 1926.

1,584,428

UNITED STATES PATENT OFFICE.

JOSEPH L. BREDAR, OF ROCK ISLAND, ILLINOIS.

ANTICHATTER FOR BALL JOINTS.

Application filed March 31, 1924. Serial No. 703,162.

This invention relates to a wear take-up device for use in connection with universal joints.

The object of the invention is to provide a simple and efficient device for taking up play at the ball joints and to prevent chattering, which may be readily and quickly applied without dismantling the joints or any of its parts and which may be adjusted to compensate wear.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

The accompanying drawing represents a plan view of the universal joint and adjacent parts of a Ford car with this improved attachment shown applied.

In the embodiment illustrated a differential shaft tube which is shown at 1 supports the radius rod 2 in the usual manner. The joint 3 is a universal joint which connects the differential shaft with the transmission mechanism and it is to keep the parts of this joint tight that this attachment is designed.

The antichattering device constituting this invention comprises two members 5 and 15 which are located on opposite sides of the joint 3 and are exactly alike, hence one only will be described in detail. These members 5 and 15 are connected with the radius rods 2 at their junction with the shaft tubing 1 and with the crank case arms 4 at opposite sides of the transmission mechanism.

Each of these members 5 and 15 includes a rod 6 having a hook or bill 7 at its front end designed to be engaged with the radius rod 2 and at its other end is threaded for engagement with a take-up swivel 8 which has an eye bolt 9 swiveled to one end and the other end having threaded engagement with the rod 6. A coiled spring 10 is connected at one end with the eye bolt 9 and at its other end with an eye 12 at one end of a rod 11, the other end of which has a hook 13 designed to be engaged with the crank case arm 4.

These members 5 and 15 when located as shown in the drawings operate to exert a pulling action which forces the members or caps of the ball joint 3 toward each other and take up any wear or play which may occur in the joint. It is of course understood that the springs 10 are made strong and sturdy to resist the strains to which they will be subjected. Should their tension become weakened they may be adjusted by turning the members 8 and new springs may be substituted when necessary by simply disconnecting the ends of the old ones from the members or eye bolts 9 and 11 and connecting up new ones.

From the above description it will be obvious that this attachment may be readily applied by simply hooking the bolts 11 around the crank case arms 4 and the bills 7 of the rods 6 around the radius rod. This will prevent chattering of the rear wheels incident to the excessive swing of the ball joints.

What is claimed is:—

An antichattering device for the universal joint of an automobile comprising two similarly constructed members for location on opposite sides of the joint and each including a rod having a hook at one end and its other end threaded, a take up swivel having threaded engagement at one end with said rod and provided at its other end with a swiveled eye-bolt, a coiled spring connected at one end with said eye-bolt, a rod connected with the other end of said spring, and having a head for engagement with a support whereby the device may be detachably connected at its opposite ends with the radius rod of an automobile and with the crank case arm whereby a pulling action is exerted to force the members of the ball joint towards each other and take up wear or play which may occur in the joint.

In testimony that I claim the foregoing as my own I have hereto affixed my signature.

JOSEPH L. BREDAR.